(12) United States Patent
Fukunaga et al.

(10) Patent No.: US 11,348,362 B2
(45) Date of Patent: May 31, 2022

(54) SCREEN PROTECTOR SYSTEM FOR USE WITH A DISPLAY SCREEN

(71) Applicant: Otter Products, LLC, Fort Collins, CO (US)

(72) Inventors: Casey K. Fukunaga, Torrance, CA (US); Gregory C. Cortese, San Diego, CA (US); Anastacio Quinto, San Diego, CA (US); Richard W. Grant, III, San Diego, CA (US); Zachary W. Zupancic, Oceanside, CA (US); Jennie-Rose Barrella, San Diego, CA (US); Sarah E. Chin, San Diego, CA (US)

(73) Assignee: Otter Products, LLC, Fort Collins, CO (US)

( * ) Notice: Subject to any disclaimer, the term of this patent is extended or adjusted under 35 U.S.C. 154(b) by 294 days.

(21) Appl. No.: 16/737,500

(22) Filed: Jan. 8, 2020

(65) Prior Publication Data

US 2020/0234029 A1 Jul. 23, 2020

Related U.S. Application Data

(60) Provisional application No. 62/794,097, filed on Jan. 18, 2019.

(51) Int. Cl.
*G06V 40/13* (2022.01)
*C09J 7/25* (2018.01)
(Continued)

(52) U.S. Cl.
CPC .......... *G06V 40/1329* (2022.01); *C09J 7/255* (2018.01); *C09J 7/38* (2018.01); *C09J 7/385* (2018.01);
(Continued)

(58) Field of Classification Search
CPC ......... G06K 9/00053; C09J 7/255; C09J 7/38; C09J 7/385; C09J 7/40; C09J 2203/326;
(Continued)

(56) References Cited

U.S. PATENT DOCUMENTS

| 4,823,397 A | 4/1989 | Hewitt |
| 4,836,256 A | 6/1989 | Meliconi |

(Continued)

FOREIGN PATENT DOCUMENTS

| JP | H0561069 U | 8/1993 |
| JP | 2000341383 A | 12/2000 |
| WO | 2002011161 A2 | 2/2002 |

*Primary Examiner* — Patricia L. Nordmeyer

(57) ABSTRACT

A kit for protecting a display screen of an electronic device having an in-screen fingerprint sensor is provided. The kit includes a screen protector at least partially formed from a transparent material and an interface coupler configured to be positioned between the screen protector and the display screen proximate the in-screen fingerprint sensor. The interface coupler includes a transparent carrier layer, a first adhesive layer, and a second adhesive layer. The first adhesive layer is positioned on a first surface of the transparent carrier layer and configured to be affixed to the display screen of the electronic device, the first adhesive layer comprising a silicone adhesive or a gel or a gel-like material. The second adhesive layer is positioned on a second surface of the transparent carrier layer and configured to be affixed to the screen protector.

7 Claims, 20 Drawing Sheets

(51) Int. Cl.
*C09J 7/40* (2018.01)
*C09J 7/38* (2018.01)

(52) U.S. Cl.
CPC ........... *C09J 7/40* (2018.01); *C09J 2203/326* (2013.01); *C09J 2301/1242* (2020.08); *C09J 2433/00* (2013.01); *C09J 2467/006* (2013.01); *C09J 2483/00* (2013.01); *G06F 2200/1633* (2013.01); *Y10T 428/14* (2015.01)

(58) Field of Classification Search
CPC ............ C09J 2301/1242; C09J 2433/00; C09J 2467/006; C09J 2483/00; C09J 2203/318; C09J 7/30; G06F 2200/1633; G06F 2200/1634; Y10T 428/14
See application file for complete search history.

(56) References Cited

U.S. PATENT DOCUMENTS

| | | | |
|---|---|---|---|
| 5,990,874 A | 11/1999 | Tsumura et al. | |
| 6,179,122 B1 | 1/2001 | Moncrief et al. | |
| 6,721,651 B1 | 4/2004 | Minelli | |
| 6,751,552 B1 | 6/2004 | Minelli | |
| 6,760,570 B1 | 7/2004 | Higdon | |
| 6,778,388 B1 | 8/2004 | Minelli | |
| 6,785,566 B1 | 8/2004 | Irizarry | |
| 6,844,845 B1 | 1/2005 | Whiteside et al. | |
| 6,913,201 B1 | 7/2005 | Wagner et al. | |
| 6,954,405 B2 | 10/2005 | Polany et al. | |
| 6,983,130 B2 | 1/2006 | Chien et al. | |
| 6,995,976 B2 | 2/2006 | Richardson | |
| 7,046,230 B2 | 5/2006 | Zadesky et al. | |
| 7,069,063 B2 | 6/2006 | Halkosaari et al. | |
| 7,085,542 B2 | 8/2006 | Dietrich et al. | |
| 7,146,701 B2 | 12/2006 | Mahoney et al. | |
| 7,158,376 B2 | 1/2007 | Richardson et al. | |
| 7,180,735 B2 | 2/2007 | Thomas et al. | |
| 7,236,588 B2 | 6/2007 | Gartrell | |
| 7,352,961 B2 | 4/2008 | Watanabe et al. | |
| 8,548,541 B2 | 10/2013 | Rayner | |
| 8,915,361 B2 | 12/2014 | Rayner | |
| 2001/0006714 A1* | 7/2001 | Bull | B32B 27/36 428/40.1 |
| 2005/0279661 A1 | 12/2005 | Hodges | |
| 2012/0118773 A1 | 5/2012 | Rayner | |
| 2012/0314354 A1 | 12/2012 | Rayner | |
| 2013/0042581 A1 | 2/2013 | Holben et al. | |
| 2013/0220841 A1 | 8/2013 | Yang | |
| 2013/0292269 A1 | 11/2013 | Tages | |
| 2017/0054466 A1* | 2/2017 | Flores | G06F 1/1656 |
| 2017/0217143 A1* | 8/2017 | Kim | B32B 27/06 |
| 2019/0238171 A1* | 8/2019 | McGuire, Jr. | H04B 1/3888 |

* cited by examiner

SCREEN PROTECTOR SYSTEM FOR USE WITH A DISPLAY SCREEN

CROSS REFERENCE TO RELATED APPLICATIONS

This application claims priority to U.S. Provisional Patent Application No. 62/794,097, filed Jan. 18, 2019, the entire contents of which is hereby incorporated by reference in its entirety.

BACKGROUND

The present invention relates generally to protective covers and screen protectors for display screens of electronic devices.

Display screens for electronic devices are available that include an in-display or under-display fingerprint sensor. These sensors typically include an optical scanners or an ultrasonic scanners under the display screen that use light or ultrasound, respectively, to produce an image of a contacting fingerprint that can be compared to a reference image to unlock or provide access to the electronic device. Device manufacturers are able to maximize the display size on devices because the fingerprint sensor is in or underneath the display and other surface area on the device not have to be devoted or dedicated to the fingerprint sensor alone.

Screen protectors are used to cover and protect the display screens of electronic devices. Screen protectors may be used to protect, for example, the surface of digital electronic device display components during manufacture, or may be adhered to a display screen of a completed device to protect it from damage during normal day-to-day use. Screen protectors may be provided as a stand-alone component, or they may be integrated into a protective case. At least a portion of the screen protector is often transparent, and may permit the use of touch-sensitive features of the electronic device through the screen protector.

In-display and under-display fingerprint sensors often have problems accurately reading fingerprints through screen protectors. Improvements in the foregoing are desired.

SUMMARY

In one exemplary embodiment, a kit for protecting a display screen of an electronic device including an in-screen fingerprint sensor is provided. The kit includes a screen protector at least partially formed from a transparent material and an interface coupler configured to be positioned between the screen protector and the display screen proximate the in-screen fingerprint sensor. The interface coupler includes a transparent carrier layer, a first adhesive layer, and a second adhesive layer. The first adhesive layer is positioned on a first surface of the transparent carrier layer and configured to be affixed to the display screen of the electronic device, the first adhesive layer comprising a silicone adhesive or a gel or a gel-like material. The second adhesive layer is positioned on a second surface of the transparent carrier layer and configured to be affixed to the screen protector.

In one exemplary embodiment, a screen protector for protecting a display screen of an electronic device having an in-screen fingerprint sensor is provided. The screen protector includes a transparent material configured to at least partially cover the display screen of the electronic device and an interface coupler. The interface coupler is configured to be positioned between the transparent material and the display screen proximate the in-screen fingerprint sensor. The interface coupler includes a transparent carrier layer, a first adhesive layer, and a second adhesive layer. The first adhesive layer is positioned on a first surface of the transparent carrier layer and configured to be affixed to the display screen of the electronic device, the first adhesive layer comprising a silicone adhesive or a gel or gel-like material. The second adhesive layer positioned on a second surface of the transparent carrier layer and affixed to the transparent material. The interface coupler improves optical coupling between an outer surface of the transparent material of the screen protector and the display screen thereby improving operation of the fingerprint sensor through the transparent material of the screen protector.

In one exemplary embodiment, a screen protector for protecting a display screen of an electronic device which has an in-screen fingerprint sensor is provided. The screen protector includes a transparent front-facing layer and a coupling layer affixed to and completely covering a rear surface of the transparent front-facing layer. The coupling layer includes a silicone adhesive or a gel or gel-like material. The coupling layer is configured to affix the screen protector to the display screen of the electronic device. In a more particular embodiment, the screen protector further includes a transparent rear-facing layer affixed to the coupling layer, the transparent rear-facing layer comprising an aperture configured to align with the in-screen fingerprint sensor when the screen protector is affixed to the display screen of the electronic device, the coupling layer configured to directly contact the display screen of an electronic device through the aperture when the screen protector is affixed to the display screen of the electronic device.

In one exemplary embodiment, a protective case for use with an electronic device having a display screen and a fingerprint sensor located within a perimeter of the display screen is provided. The protective case comprises a shell configured to cover at least a portion of the electronic device when the electronic device is installed in the protective case. The protective case further comprises a screen protector having a substantially transparent portion configured to cover at least a portion of the display screen of the installed electronic device. The protective case further comprises a substantially transparent interface coupler configured to be positioned between the screen protector and the display screen of the installed electronic device over an area of the display screen proximate the fingerprint sensor. The interface coupler includes a base layer and a first adhesive layer on a first surface of the base layer. The first adhesive layer is configured to removably couple the interface coupler to the display screen in the area of the display screen proximate the fingerprint sensor. The first adhesive layer comprises a silicone adhesive or a gel or a gel-like material. The interface coupler also includes a second adhesive layer on a second surface of the base layer opposite the first surface. The second adhesive layer is configured to removably couple the interface coupler to the screen protector.

In one exemplary embodiment, a screen protector system for use with an electronic device having a touch screen display and a fingerprint sensor located in or under the touch screen display is provided. The screen protector system comprises a screen protector and an interface coupler. The screen protector has a substantially transparent portion configured to cover at least a portion of the touch screen display. The screen protector is configured to permit operation of the touch screen display through the screen protector. The interface coupler is configured to be positioned between the screen protector and the touch screen display proximate the fingerprint sensor. The interface coupler is substantially transparent and includes a carrier layer and a first adhesive layer on a first surface of the carrier layer where the first adhesive layer is configured to couple the interface coupler to the touch screen display. The first adhesive layer comprises a silicone adhesive or a gel or gel-like material. The interface coupler also includes a second adhesive layer on a second surface of the carrier layer opposite the first surface. The second adhesive layer is configured to couple the interface coupler to the screen protector.

In one exemplary embodiment, a transparent or substantially transparent interface coupler configured to be used with an electronic device and a screen protector film for the electronic device is provided. The interface coupler is configured to be positioned between the screen protector film and a touch screen display of the electronic device proximate a fingerprint sensor located within a perimeter of the touch screen display. The interface coupler comprises a base layer, a first adhesive layer, a first release liner, a second adhesive layer, and a second release liner. The first adhesive layer is on a first surface of the base layer and configured to adhere the interface coupler to the touch screen display of the electronic device. The first adhesive layer comprises a silicone adhesive or a gel or gel-like material. The first release liner covers the first adhesive layer and is configured to be removed prior to the first adhesive layer being adhered to the touch screen display of the electronic device. The second adhesive layer is on a second surface of the base layer opposite the first surface and configured to adhere the interface coupler to the screen protector film. The second release liner covers the second adhesive layer and configured to be removed prior to the second adhesive layer being adhered to the screen protector film.

DETAILED DESCRIPTION

Figure 1:
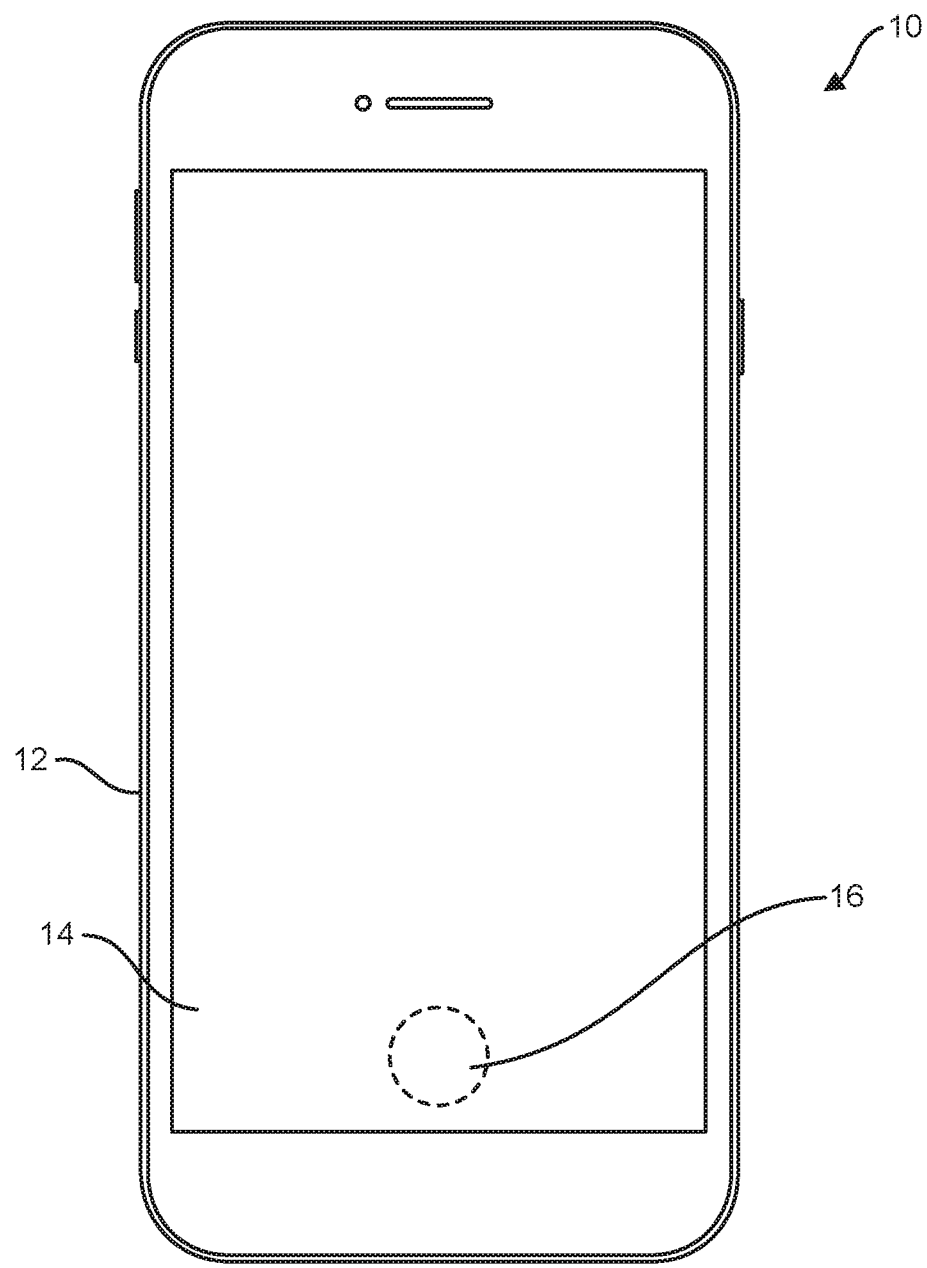
FIG. 1 illustrates an exemplary electronic device.

FIG. 1 illustrates an exemplary electronic device 10. Examples of electronic device 10 include smartphones, tablet computers, gaming devices, audio players, video players, cameras, portable computers, two-way radios, GPS receivers, smart glasses, virtual reality glasses or helmets, and masks or eyewear that include an electronic display. In some embodiments, electronic device 10 includes a housing 12 and a display screen 14. In some embodiments, display screen 14 is an interactive touch screen, such as a capacitive touch screen, that allows a user to interact with display screen 14 of electronic device 10.

At least a portion of display screen 14 illustratively includes an in-screen fingerprint sensor 16 for scanning or producing an image of a user's fingerprint that can be compared to a reference image to provide access to one or more functions of the electronic device 10. In some embodiments, fingerprint sensor 16 is an ultrasonic fingerprint sensor. In some embodiments, fingerprint sensor 16 is an optical fingerprint sensor. In some embodiments, fingerprint sensor 16 is a capacitive fingerprint sensor. In some embodiments, fingerprint sensor 16 is another type of biometric sensor or scanner. In some embodiments, fingerprint sensor 16 may be implemented as a security feature to unlock the electronic device 10 for a user. While fingerprint sensor 16 may be described as being "in" display screen 14, it may actually be located under display screen 14 and within a perimeter of display screen 14 when display screen 14 is viewed from a front side. Fingerprint sensor 16 may be configured such that it reads a fingerprint through display screen 14 from a finger that is placed on display screen 14. In other examples, fingerprint sensor 16 may be integrated with or manufactured as part of display screen 14.

Figure 2:
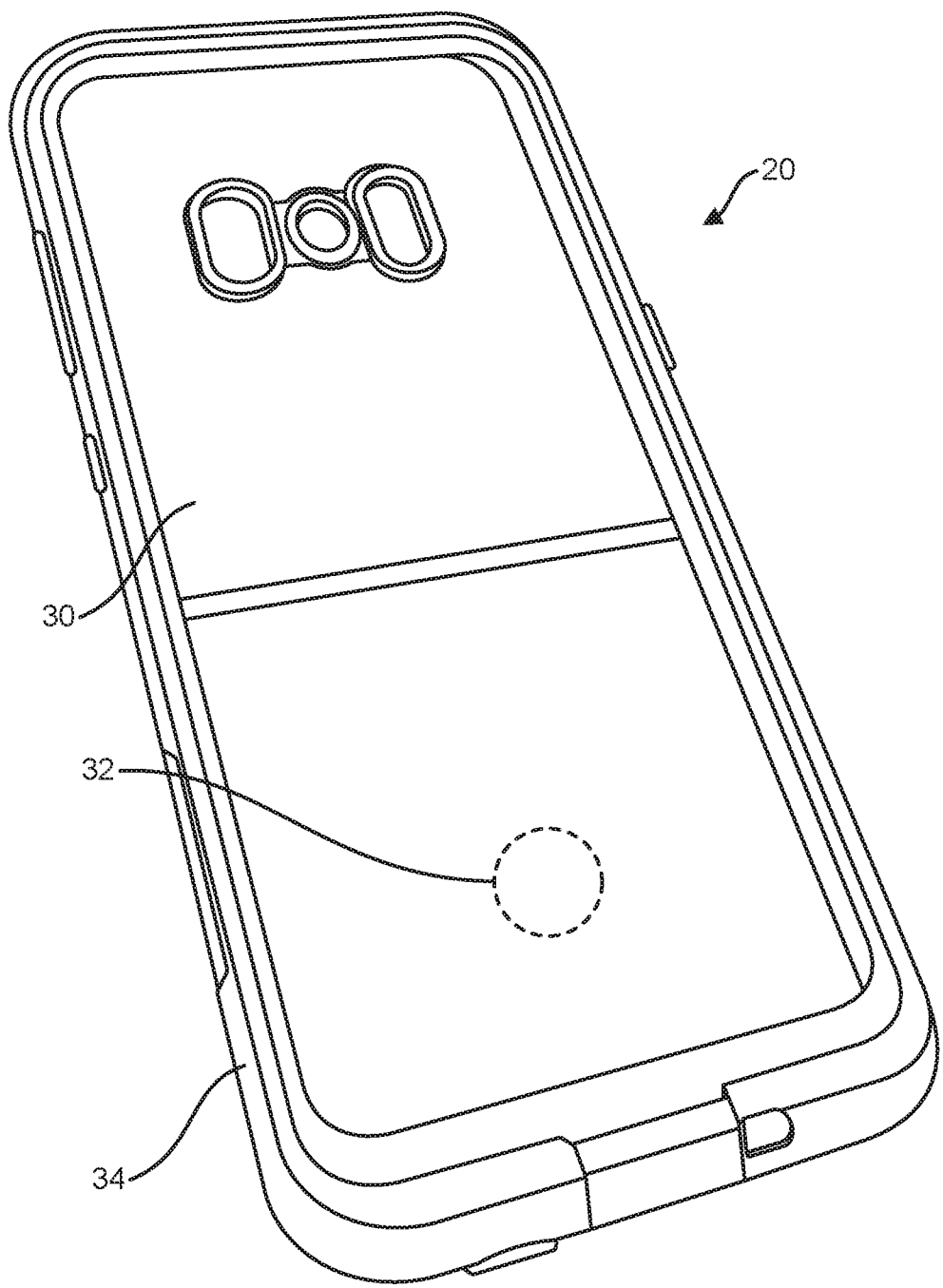
FIG. 2 illustrates an exemplary protective case including a built-in polymeric screen protector in an assembled state configured to receive the electronic device of FIG. 1.
Figure 3:
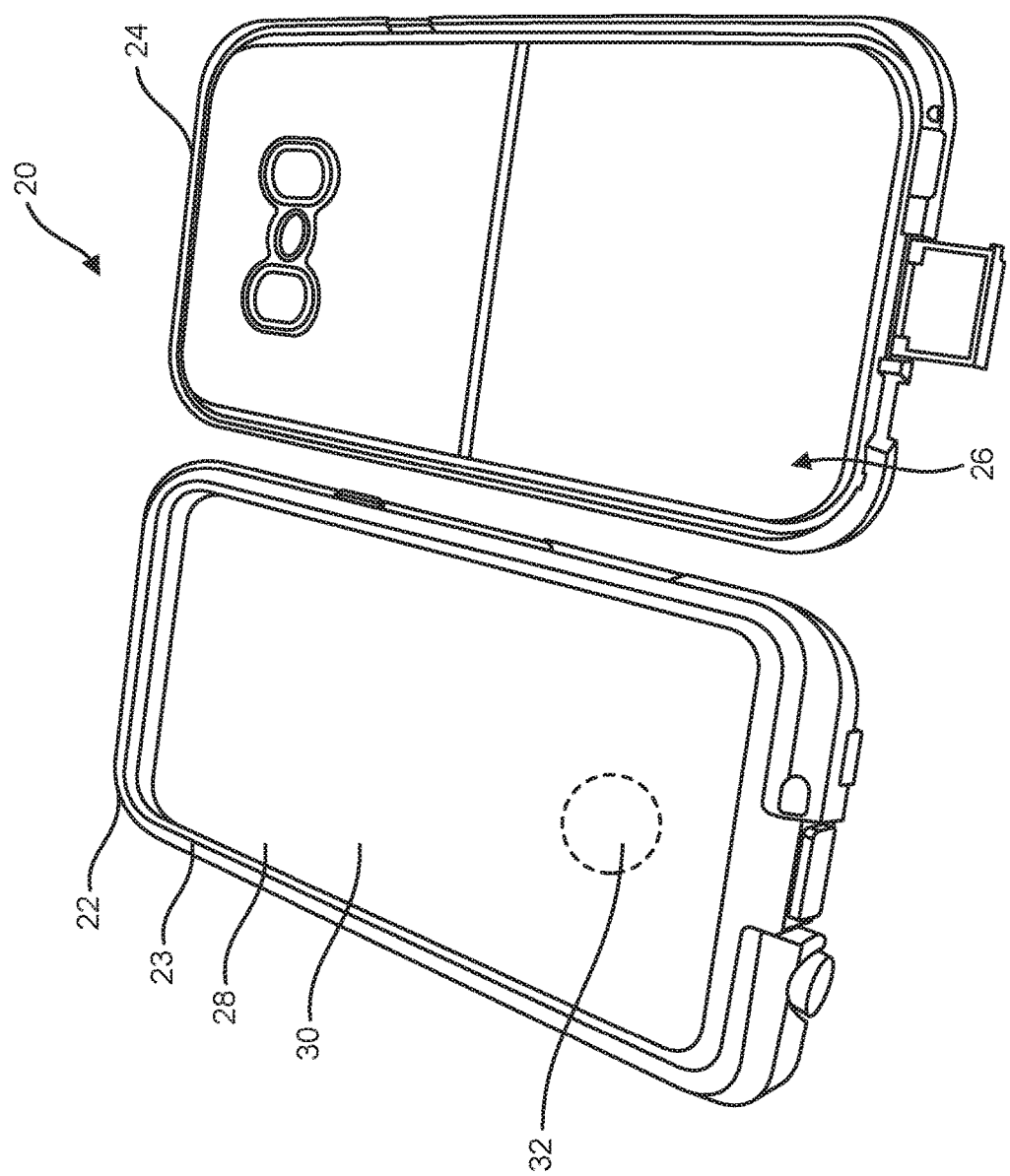
FIG. 3 illustrates the protective case of FIG. 2 in a disassembled state.

FIGS. 2 and 3 illustrate an exemplary protective case 20 for use with electronic device 10. In the illustrated embodiment, protective case 20 is a two-piece case including a front portion 22 that releasably couples to a rear portion 24. Front potion 22 and rear portion 24 couple together to define an interior cavity 26 for receiving the electronic device 10. In other embodiments, protective case 20 may be a one-piece case, or may comprise three or more pieces including one or more shell members and one or more cushion members. Exemplary protective cases are disclosed in U.S. Pat. Nos. 9,888,753; 9,955,762; 10,090,877; and 10,136,716, the disclosures of each of which are hereby incorporated by reference in their entirety.

Front portion 22 illustratively includes an aperture 28 configured to align with at least a portion of a display screen of the received electronic device. Aperture 28 is at least partially covered by a transparent or substantially transparent screen protector 30. In the exemplary embodiment illustrated in FIGS. 2 and 3, screen protector 30 is affixed to a perimeter frame 23 of front portion 22 with a suitable adhesive. However, other configurations are possible.

At least a portion of screen protector 30 is transparent, or substantially transparent, allowing a user to view the display screen 14 of the electronic device 10 through screen protector 30. In some embodiments, screen protector 30 is configured to permit a user to interact with one or more touch screen sensors of the display screen 14 of the received electronic device 10 through the screen protector 30.

As illustrated in FIGS. 2 and 3, in some exemplary embodiments screen protector 30 is provided as part of a protective case 20, referred to as a built-in screen protector 30. Exemplary protective cases 20 including a built-in screen protector 30 include the OTTERBOX DEFENDER SERIES protective case and the LIFEPROOF FRE protective case, each available from Otter Products, LLC. In other embodiments, the screen protector is not provided as a part of a protective case 20, but provided as a separate component unattached to any protective case 20. This configuration may be referred to as a stand-alone screen protector 30. In some more particular embodiments, stand-alone screen protectors 30 are compatible with a separate protective case 20. In other more particular embodiments, stand-alone screen protectors 30 are not compatible with a protective case 20. The stand-alone screen protector 30 may be coupled to the electronic device 10, such as with a suitable adhesive. In some embodiments, stand-alone screen protector 30 is removably coupled to the electronic device 10. In some embodiments, stand-alone screen protector 30 is permanently coupled to the electronic device 10. Exemplary stand-alone screen protectors 30 include ALPHA GLASS and AMPLIFY glass screen protectors and ALPHA FLEX and CLEARLY PROTECTED polymeric screen protectors, each available from Otter Products, LLC.

In some exemplary embodiments, screen protector 30 is formed from a polymeric material. Exemplary polymeric materials include polyethylene terephthalate (PET), polycarbonate (PC), and poly(methyl methacrylate) (PMMA). In some exemplary embodiments, screen protector 30 is formed from a glass, such as soda lime glass or fortified glass. In some exemplary embodiments, screen protector 30 includes one or more film layers and one or more coating layers, such as hardcoat layers, oleophobic anti-fingerprint coatings, anti-microbial coatings, anti-glare coatings, and anti-reflective coatings.

In some exemplary embodiments, screen protector 30 has a thickness as little as 0.020 mm, 0.025 mm, 0.05 mm, 0.075 mm, 0.1 mm, 0.125 mm, 0.15 mm, 0.175 mm, 0.2 mm, 0.25 mm, or greater, or within any range defined between any two of the foregoing values, such as 0.020 mm to 0.25 mm, 0.05 mm to 0.2 mm, or 0.1 mm to 0.15 mm.

A region 32 of screen protector 30 is configured to be positioned proximate the fingerprint sensor 16 of electronic device 10 when electronic device 10 is installed in protective case 20. In the exemplary embodiment illustrated in FIGS. 2 and 3, region 32 of screen protector 30 is configured to be positioned proximate the fingerprint sensor 16 of electronic device 10 when the electronic device 10 is received within the internal cavity 26 of protective case 20. In embodiments where screen protector 30 is not attached to a protective case 20, region 32 of screen protector 30 is configured to be positioned proximate the fingerprint sensor 16 of electronic device 10 when the screen protector 30 is affixed to the electronic device 10.

In some embodiments, the performance and/or effectiveness of the fingerprint sensor 16 is diminished when used with a screen protector 30. Without wishing to be held to any particular theory, it is believed that small gaps or misalignments between the surface of the display screen 14 and the screen protector 30 produce interference, reflections, refraction, and/or a loss of signal for the fingerprint sensor 16 in reading an applied fingerprint and producing an accurate image of the same. In particular, the effectiveness of fingerprint sensors 16 may be significantly deteriorated by the presence of any gaps or points of non-contact between the display screen 14 and screen protector 30.

Figure 4:
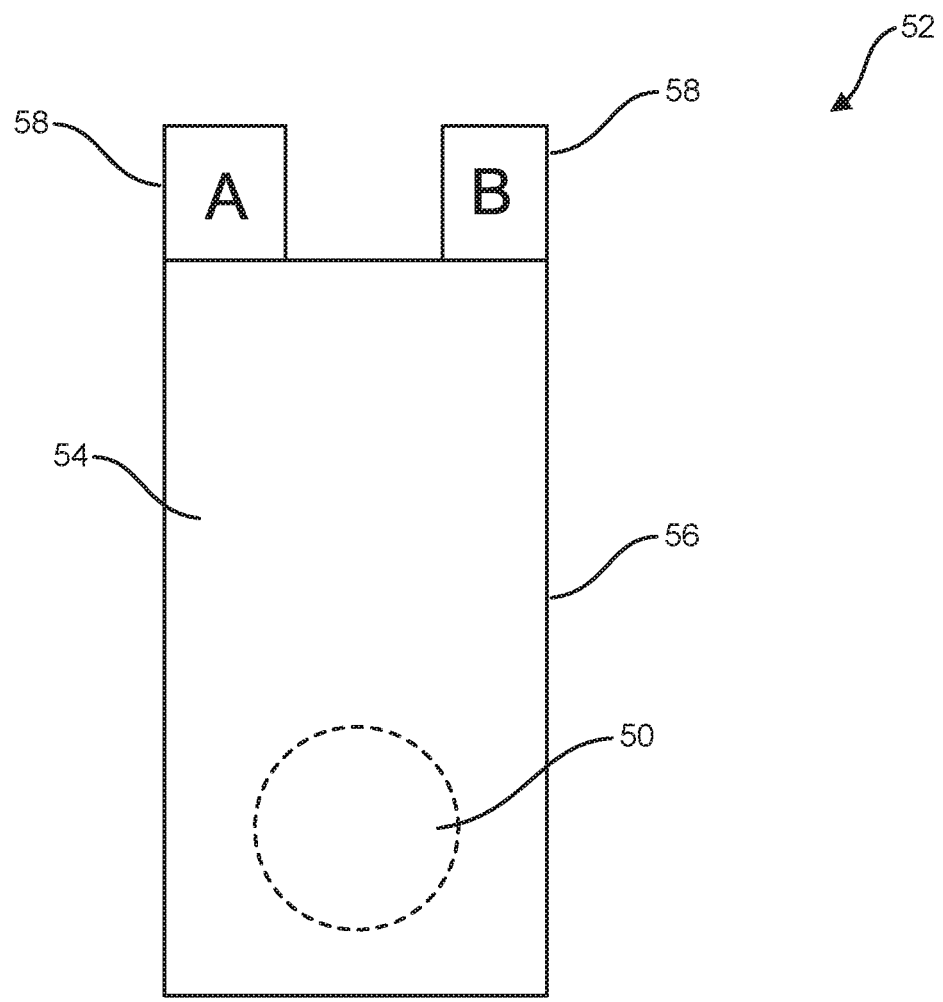
FIG. 4 illustrates an exemplary interface coupler assembly including an interface coupler and release liners for use with the screen protector of FIG. 1.
Figure 5:
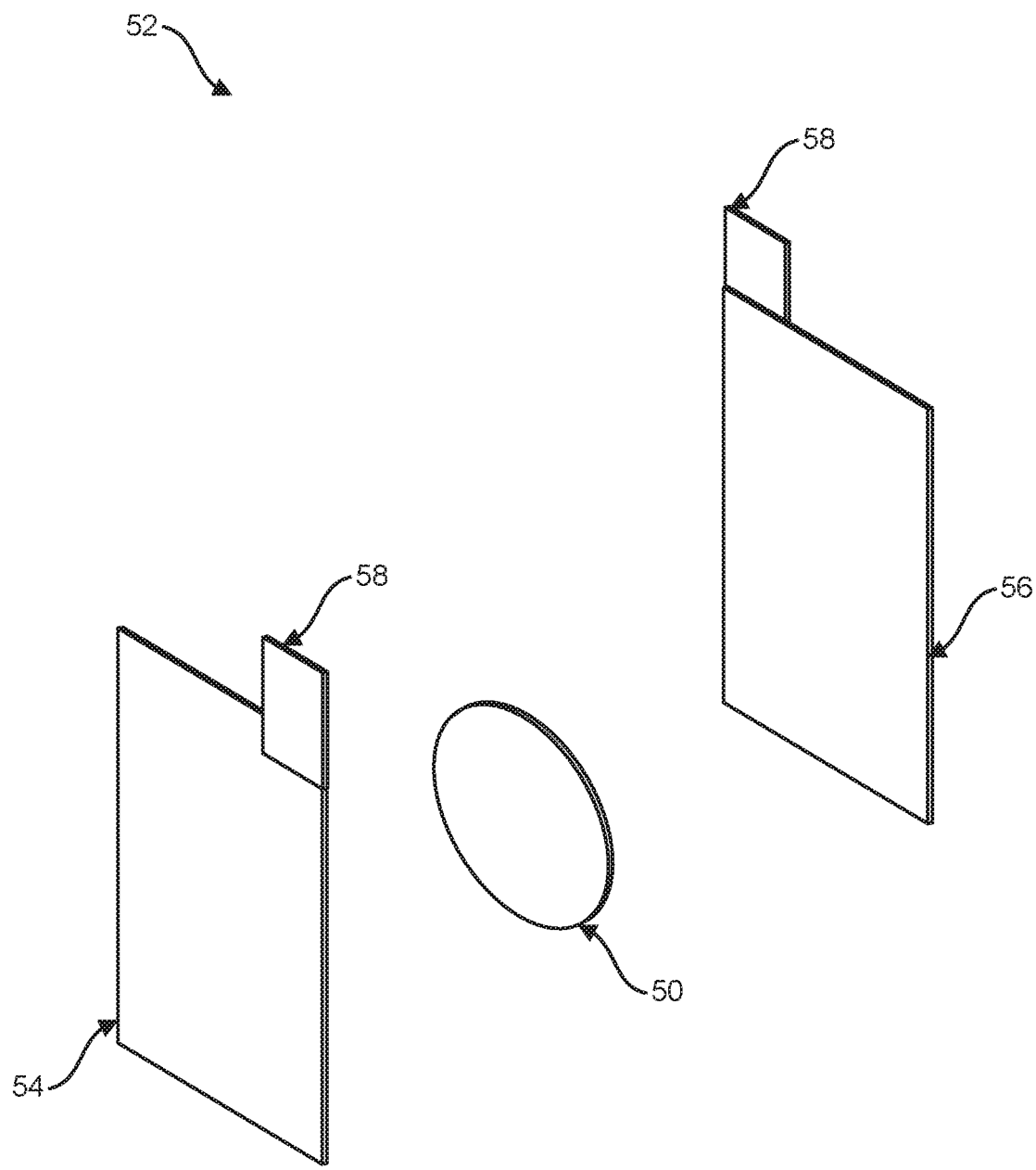
FIG. 5 illustrates an exploded view of the interface coupler assembly of FIG. 4.

Referring next to FIGS. 4-6B, an exemplary interface coupler 50 is provided. As illustrated in FIG. 4, in some exemplary embodiments, an interface coupler assembly 52 includes an interface coupler 50, a first release liner 54 covering a first surface of interface coupler 50, and a second release liner 56 covering a second opposing surface of interface coupler 50. Interface coupler 50 is sandwiched between first release liner 54 and second release liner 56. First release liner 54 and second release liner 56 may each include one or more removal tabs 58 configured to allow a user to grasp the removal tab 58 to remove the corresponding release liner 54, 56 from interface coupler 50. FIG. 5 illustrates an exploded view of the interface coupler assembly of FIG. 4.

In some exemplary embodiments, first release liner 54 and/or second release liner 56 is formed from a transparent or semi-transparent material. In some exemplary embodiments, first release liner 54 and/or second release liner 56 is formed from a polymeric material, such as polyethylene terephthalate (PET). In some exemplary embodiments, first release liner 54 and/or second release liner 56 each independently have a thickness as little as 0.005 mm, 0.01 mm, 0.02 mm, 0.025 mm, 0.03 mm, 0.04 mm, 0.05 mm, as great as 0.06 mm, 0.07 mm, 0.075 mm, 0.08 mm, 0.09 mm, 0.01 mm, 0.02 mm, 0.025 mm, 0.05 mm, 0.1 mm, or greater, or within any range defined between any two of the foregoing values, such as 0.005 mm to 0.1 mm, 0.01 mm to 0.02 mm, or 0.025 mm to 0.01 mm.

Figure 6A:
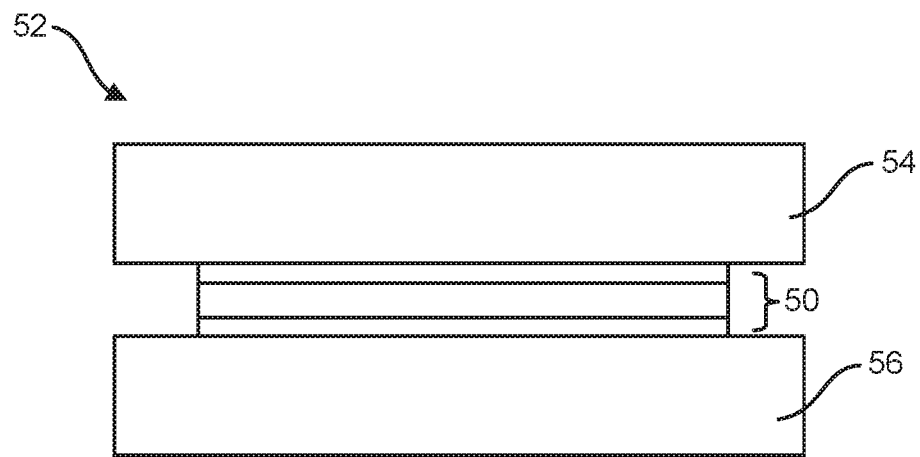
FIG. 6A illustrates a sectional view of the interface coupler assembly of FIG. 4.

FIG. 6A illustrates a side sectional view of the interface coupler assembly 52 of FIG. 4. It should be understood that sizes and thicknesses of any of the elements in any of the figures herein may not be representative and/or may not be to scale.

Figure 6B:
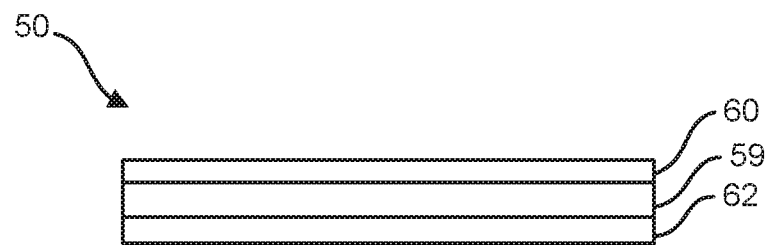
FIG. 6B illustrates a sectional view of the interface coupler of FIG. 6A.

FIG. 6B illustrates a sectional view of interface coupler 50. Interface coupler 50 is configured to allow fingerprint scanner 16 of electronic device 10 to obtain an image of a user's fingerprint positioned in region 32 on the outside of screen protector 30. In some exemplary embodiments, interface coupler 50 is comprised of a plurality of layers.

Interface coupler 50 illustratively includes a transparent, or substantially transparent, carrier layer 59. In some configurations, carrier layer 59 may also be referred to as a base layer, an interface layer, or an interface coupler. In some exemplary embodiments, transparent carrier layer 59 is formed from a polymeric material, such as polyethylene terephthalate (PET). In some exemplary embodiments, transparent carrier layer 59 has a thickness as little as 0.001 mm, 0.005 mm, 0.01 mm, 0.015 mm, 0.02 mm, 0.025 mm, 0.03 mm, 0.04 mm, 0.05 mm, as great as 0.06 mm, 0.07 mm, 0.075 mm, 0.08 mm, 0.09 mm, 0.01 mm, 0.02 mm, 0.025 mm, 0.05 mm, 0.1 mm, or greater, or within any range defined between any two of the foregoing values, such as 0.001 mm to 0.1 mm, 0.001 mm to 0.025 mm, or 0.01 mm to 0.02 mm.

Interface coupler 50 illustratively includes a first adhesive layer 60 affixed to a first surface of transparent carrier layer 59. First adhesive layer 60 is configured to be affixed, coupled, or adhered to the display 14 of electronic device 10 proximate fingerprint scanner 16. In some exemplary embodiments, first adhesive layer 60 is configured to be releasably or removably affixed to a glass surface of display 14. In some exemplary embodiments, first adhesive layer 60 is configured to be permanently affixed to display 14. In some exemplary embodiments, first adhesive layer 60 is formed from a polymeric material, such as a silicone adhesive. In some exemplary embodiments, first adhesive layer 60 is formed from a gel or gel-like material. In some exemplary embodiments, first adhesive layer 60 has a thickness as little as 0.001 mm, 0.005 mm, 0.01 mm, 0.015 mm, 0.02 mm, 0.025 mm, 0.03 mm, 0.04 mm, 0.05 mm, as great as 0.06 mm, 0.07 mm, 0.075 mm, 0.08 mm, 0.09 mm, 0.1 mm, 0.2 mm, 0.25 mm, 0.5 mm, 1 mm, or greater, or within any range defined between any two of the foregoing values, such as 0.001 mm to 1 mm, 0.005 mm to 0.025 mm, or 0.01 mm to 0.02 mm.

Without wishing to be held to any particular theory, it is believed that that the use of a pliable or flexible first adhesive layer 60, such as a silicone adhesive, a gel, or a gel-like material, allows for the first adhesive layer 60 to provide more complete coverage and/or contact with the display 14 of electronic device 10, reducing or eliminating gaps therebetween. In more particular embodiments where fingerprint sensor 16 is an ultrasonic sensor, a first adhesive layer 60 formed from a silicone adhesive or a gel or gel-like material contacts across an entire surface of the display above fingerprint sensor 16, allowing for the ultrasonic signal transmitted from the fingerprint sensor 16 to be evenly and/or more consistently transmitted through interface coupler 50 with reduced disturbance or distortion of the transmitted signal. In some embodiments, the silicone adhesive or the gel or gel-like material is semi-flowable, allowing the first adhesive layer 60 to fill any gaps between interface coupler 50 and display 14.

Interface coupler 50 illustratively includes a second adhesive layer 62 affixed to a second surface of transparent carrier layer 59 opposite the first surface that is affixed, coupled, or adhered to first adhesive layer 60. Second adhesive layer 62 is configured to be affixed to the region 32 of screen protector 30. In some exemplary embodiments, second adhesive layer 62 is configured to be releasably or removably affixed to screen protector 30. In some exemplary embodiments, second adhesive layer 62 is configured to be permanently affixed to screen protector 30. Second adhesive layer 62 is illustratively formed from a different material than first adhesive layer 60. In some exemplary embodiments, second adhesive layer 62 is formed from an acrylic material. In some embodiments, second adhesive layer 62 has a higher adhesive strength with screen protector 30 than first adhesive layer 60 has with display 14 of electronic device 10, allowing interface coupler 50 and screen protector 30 to be removed from electronic device 10 while interface coupler 50 remains adhered to screen protector 30. In other embodiments, second adhesive layer 62 has a lower adhesive strength with screen protector 30 than first adhesive layer 60 has with display 14 of electronic device 10, allowing interface coupler 50 to remain attached to electronic device 10 while the screen protector 30 and/or attached protective case 20 is replaced with a second screen protector 30 and/or protective case 20.

In some exemplary embodiments, second adhesive layer 62 has a thickness as little as 0.001 mm, 0.005 mm, 0.01 mm, 0.015 mm, 0.02 mm, 0.025 mm, 0.03 mm, 0.04 mm, 0.05 mm, as great as 0.06 mm, 0.07 mm, 0.075 mm, 0.08 mm, 0.09 mm, 0.01 mm, 0.02 mm, 0.025 mm, 0.05 mm, 0.1 mm, or greater, or within any range defined between any two of the foregoing values, such as 0.001 mm to 0.1 mm, 0.005 mm to 0.025 mm, or 0.01 mm to 0.02 mm.

Without wishing to be held to any particular theory, it is believed that the use of a suitable adhesive for the second adhesive layer 62, such as an acrylic adhesive, provides sufficient contact with the screen protector 30 to reduce or eliminate any gaps therebetween, thus allowing the use of the interface coupler 50 with a fingerprint sensor, including an in-screen ultrasonic fingerprint sensor. A suitable second adhesive layer 62 allows the ultrasonic signal transmitted from the fingerprint sensor 16 to be sufficiently transmitted through interface coupler 50 with limited or reduced disturbance or distortion of the transmitted signal.

In some examples, a screen protector may not be affixed to the display of the electronic device and/or may only be attached around the edges. In these examples, there may be slight gaps between the portions of the screen protector and the display, there may be slight relative movement between the two, and/or dust and/or other foreign matter may get between them. While these things may have some minor impact on the operation of the display through the screen protector, operation of fingerprint and/or other biometric sensors may be impacted more significantly. Therefore, use of an interface coupler, such as interface coupler 50, may provide improved performance, particularly in the area of the fingerprint sensor, by reducing or eliminating some or all of the undesirable aspects discussed above.

Figure 7:
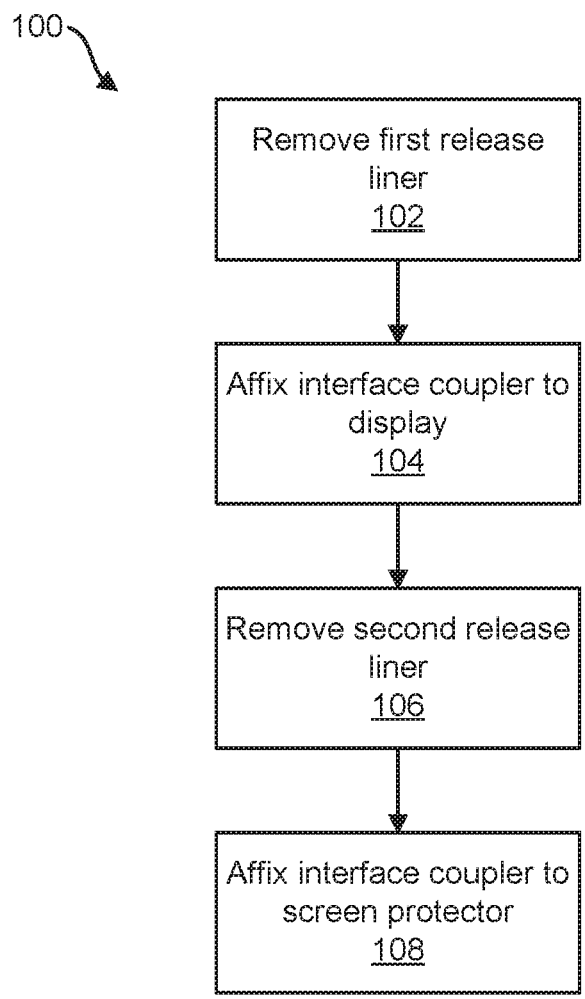
FIG. 7 is a schematic of an exemplary method of applying the accessory of FIG. 4 to an electronic device.
Figure 8A:
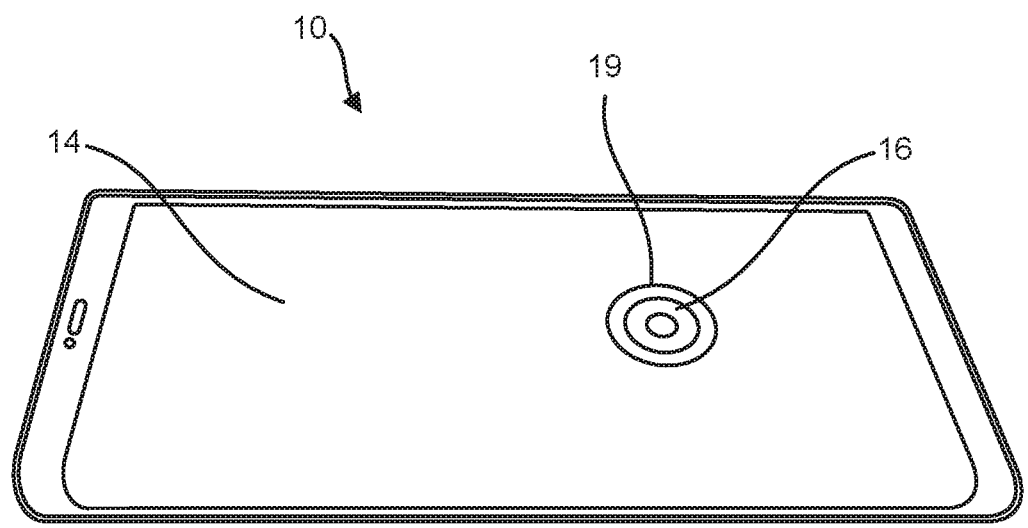
FIGS. 8A-8F illustrate applying a protective case with screen protector and an exemplary interface coupler to an electronic device.

FIG. 7 provides an exemplary method 100 of installing a protective case 20 with an integrated screen protector 30 and interface coupler 50 onto an electronic device 10 including an in-screen fingerprint sensor 16. In block 102, the first release liner 54 of interface coupler assembly 52 is removed, exposing the first adhesive layer 60. In block 104, the first adhesive layer 60 is affixed to the display 14 in a location proximate fingerprint sensor 16. As illustrated in FIG. 8A, the electronic device 10 can be activated to illuminate the location of fingerprint sensor 16 on the display screen in the form of a visual indicator 19 (which is displayed as a target). In other words, electronic device 10 executes a software app or other software to generate an image on the screen, visual indicator 19, indicating the location of fingerprint sensor 16. In normal operation, fingerprint sensor 16 and the associated region are not visible so visual indicator 19 is generated or activated in these special circumstances for purposes of installing, applying, and/or positioning an interface coupler 50 as described further herein.

Figure 8B:
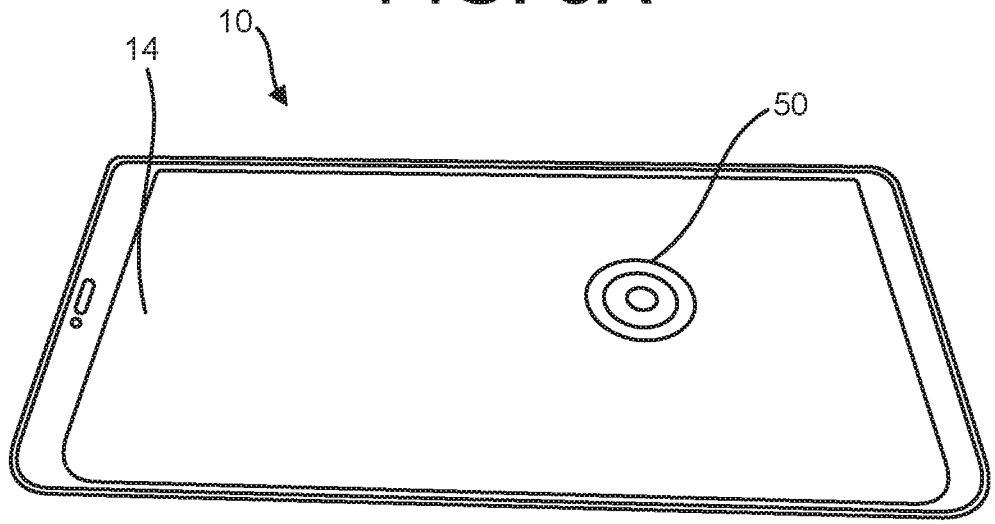

Returning to FIG. 7, in block 106, the second release liner 56 of interface coupler assembly 52 is removed, exposing the second adhesive layer 62. FIG. 8B illustrates the electronic device 10 with the interface coupler 50 positioned on display 14 proximate the fingerprint sensor 16 as determined based on visual indicator 19. Interface coupler 50 is substantially transparent so visual indicator may still be visible through it.

Figure 8C:
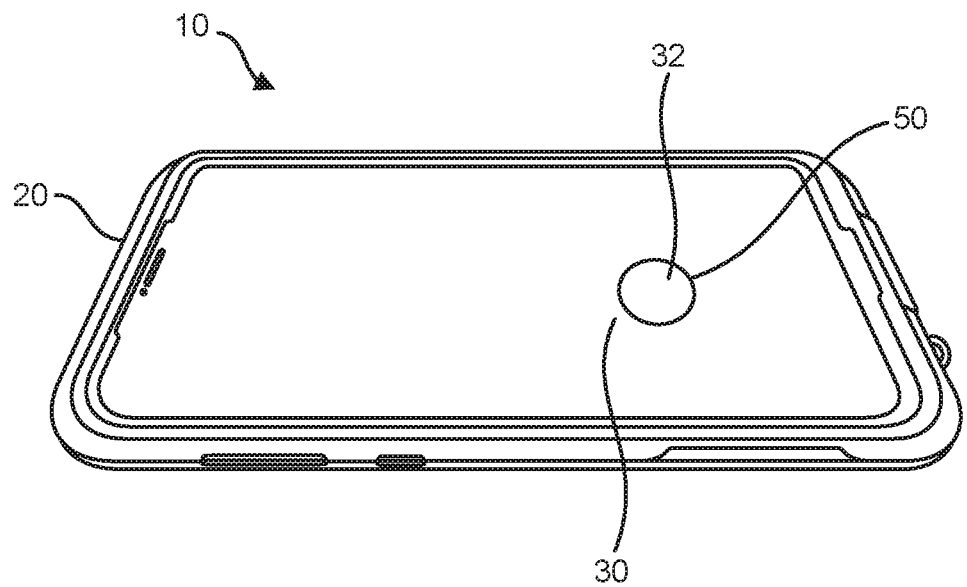
Figure 8D:
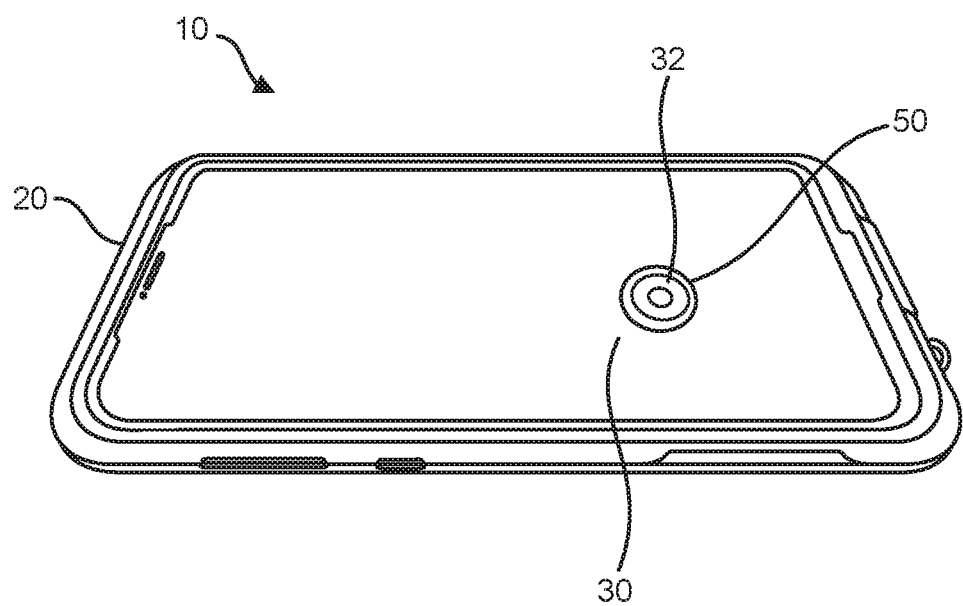

In block 108, the second adhesive layer 62 is affixed to the screen protector 30 proximate the region 32 of screen protector 30 that aligns with fingerprint sensor 16. FIG. 8C illustrates a protective case 20 with an integrated screen protector 30 being installed onto electronic device 10, bringing region 32 of screen protector 30 into contact with the exposed second adhesive layer 62 of interface coupler 50, thereby affixing second adhesive layer 62 onto an inside surface of region 32 of screen protector 30. FIG. 8C illustrates the case 20 and integrated screen protector 30 being initially affixed to second adhesive layer 62 with visual indicator 19 of display 14 of electronic device 10 not illuminated. FIG. 8D illustrates the case 20 and integrated screen protector 30 being affixed to second adhesive layer 62 with the visual indicator 19 of display 14 of electronic device 10 illuminated.

Figure 8E:
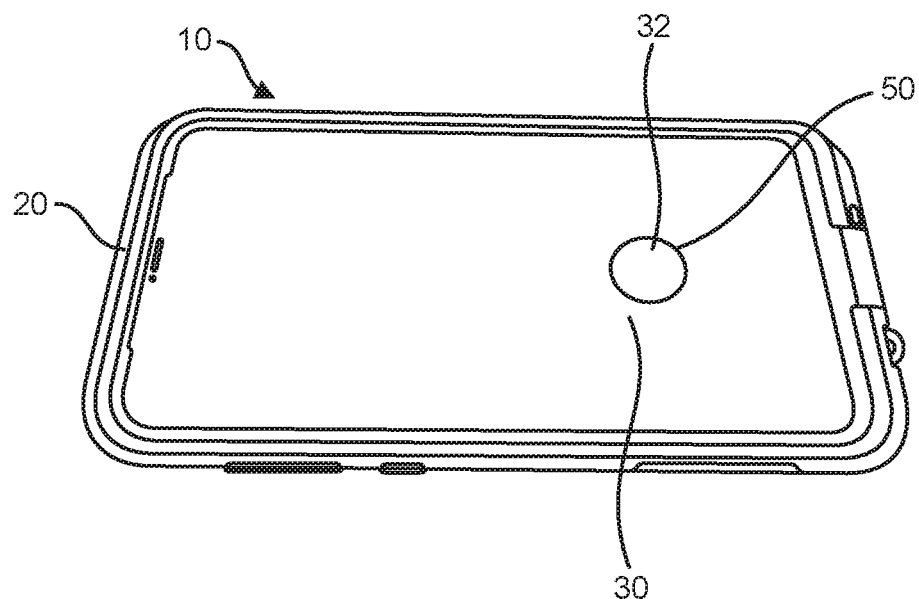
Figure 8F:
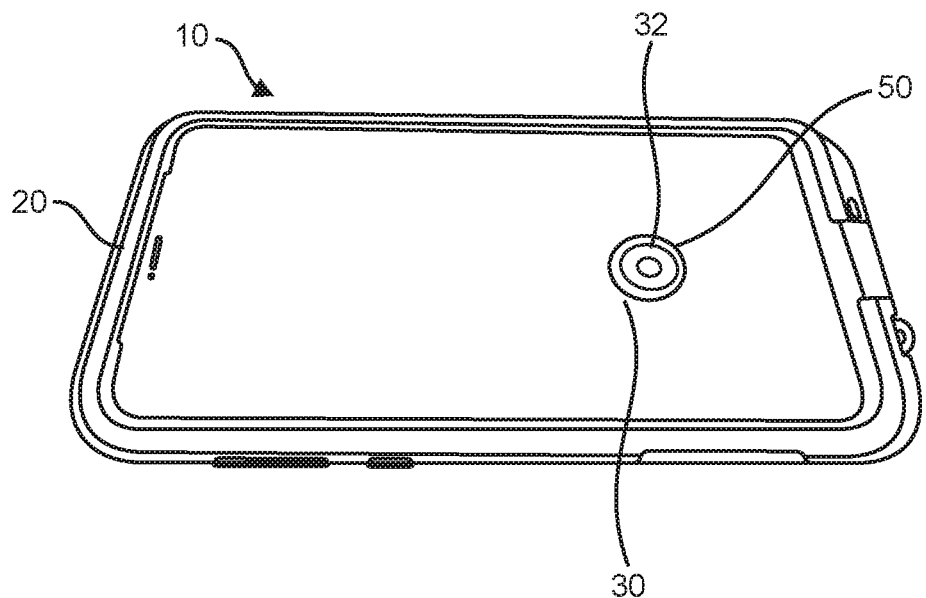

After initially affixing screen protector 30 to interface coupler 50, pressure may be applied to screen protector 30 to better form the contact between first adhesive layer 60 and the display 14, thereby wetting out the first adhesive layer 60 to improve the optical path. FIG. 8E illustrates the case 20 and integrated screen protector 30 with the second adhesive layer 62 wet out on the display 14 when the display 14 is not illuminated with visual indicator 19. FIG. 8F illustrates the case 20 and integrated screen protector 30 with the second adhesive layer 62 wet out on the display 14 when the display 14 is illuminated with visual indicator 19.

Figure 9:
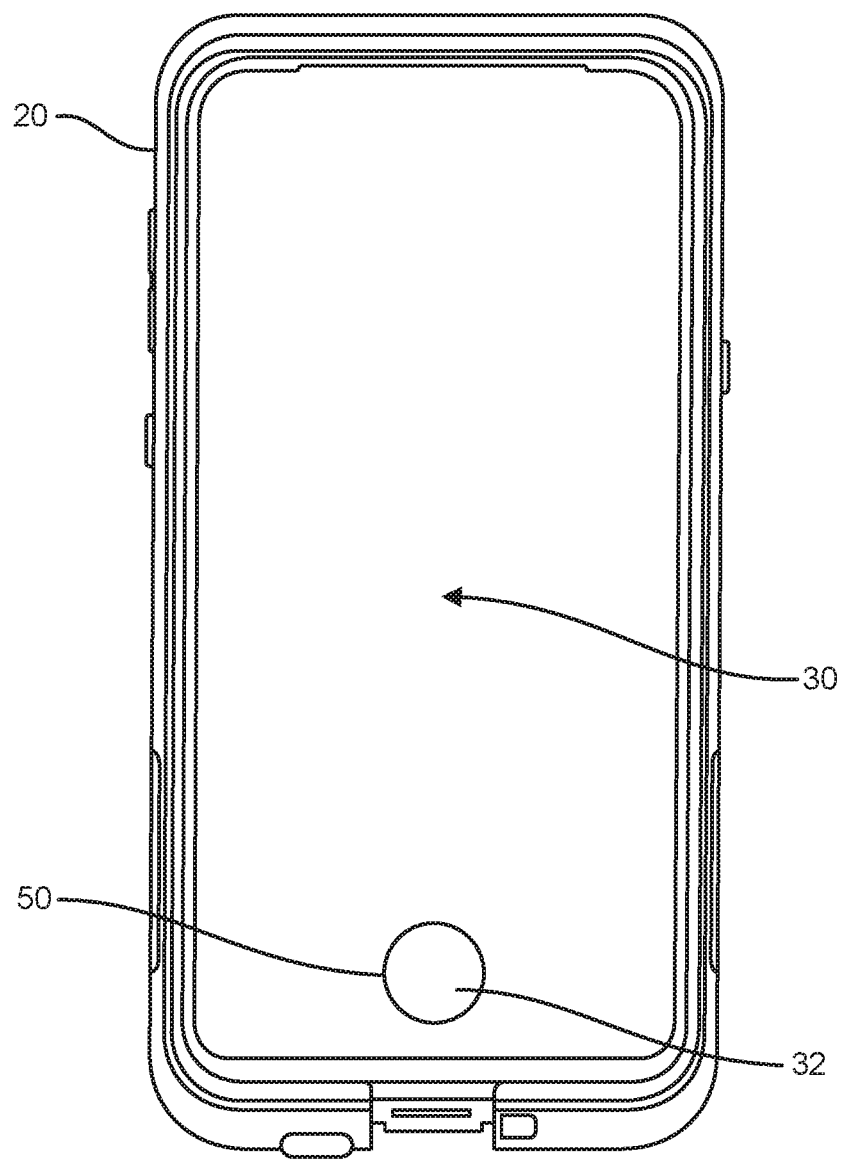
FIG. 9 illustrates an exemplary protective case including a built-in polymeric screen protector and attached interface coupler.
Figure 10:
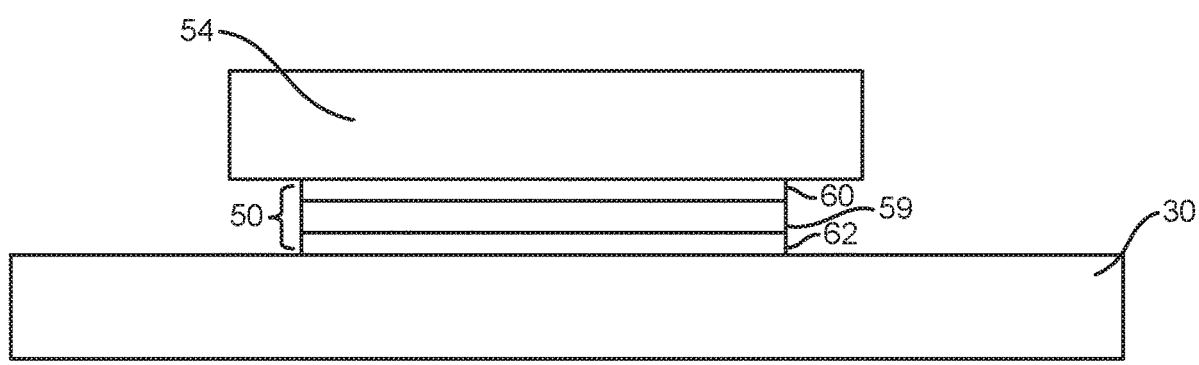
FIG. 10 illustrates a sectional view of the screen protector and interface coupler of FIG. 9.

Referring next to FIGS. 9 and 10, another exemplary embodiment of an interface coupler 50 is illustrated. As shown in FIG. 9, protective case 20 illustratively includes a built-in screen protector 30. In other embodiments, screen protector 30 may be provided as a stand-alone screen protector 30. Screen protector 30 includes a region 32 configured to align with the fingerprint sensor 16 of an electronic device 10 (see FIG. 1).

Referring to FIG. 10, screen protector 30 illustratively includes interface coupler 50 and a first release liner 54 as described above with respect to FIGS. 6A and 6B. Unlike the embodiment illustrated in FIGS. 6A and 6B, second adhesive layer 62 of FIG. 10 is provided affixed to the screen protector 30, allowing a user to simply remove first release liner 54 and adhere screen protector 30 and interface coupler 50 directly to display 14 of electronic device 10 as a single assembly.

Figure 11:
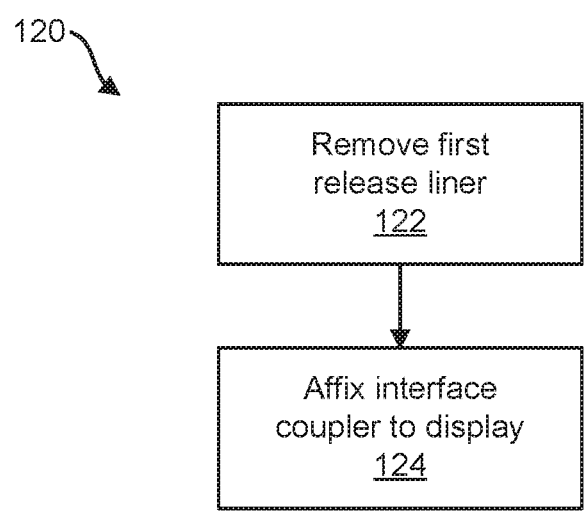
FIG. 11 is a schematic of an exemplary method of applying the screen protector and interface coupler of FIG. 9.

Referring to FIG. 11, an exemplary method 120 of installing a protective case 20 with an integrated screen protector 30 and interface coupler 50 on an electronic device 10 having an in-screen fingerprint sensor 16. In block 122, the first release liner 54 as illustrated in FIG. 10 is removed, exposing the first adhesive layer 60. In block 124, the first adhesive layer 60 is affixed to the display 14 in a location proximate fingerprint sensor 16. After initially affixing screen protector 30 to interface coupler 50, pressure may be applied to the screen protector 30 to better form the contact between first adhesive layer 60 and the display 14, thereby wetting out the first adhesive layer 60.

Figure 12:
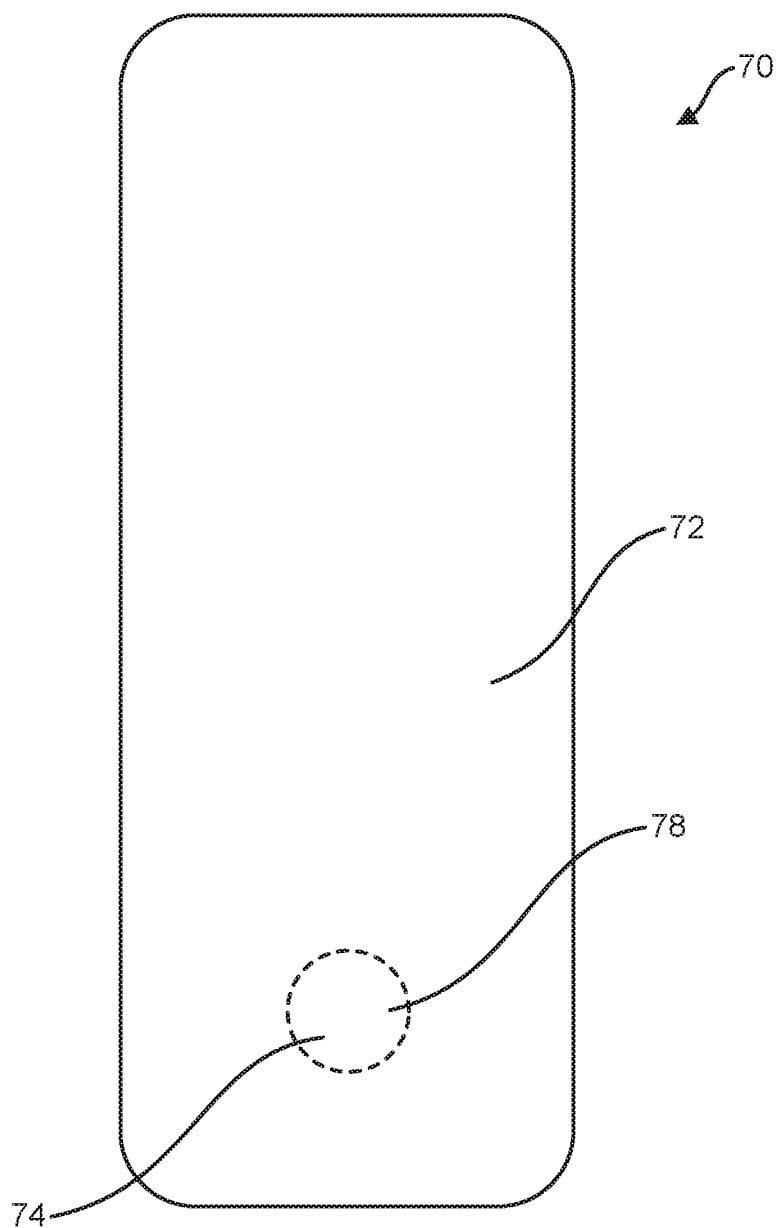
FIG. 12 illustrates an exemplary screen protector.
Figure 13:
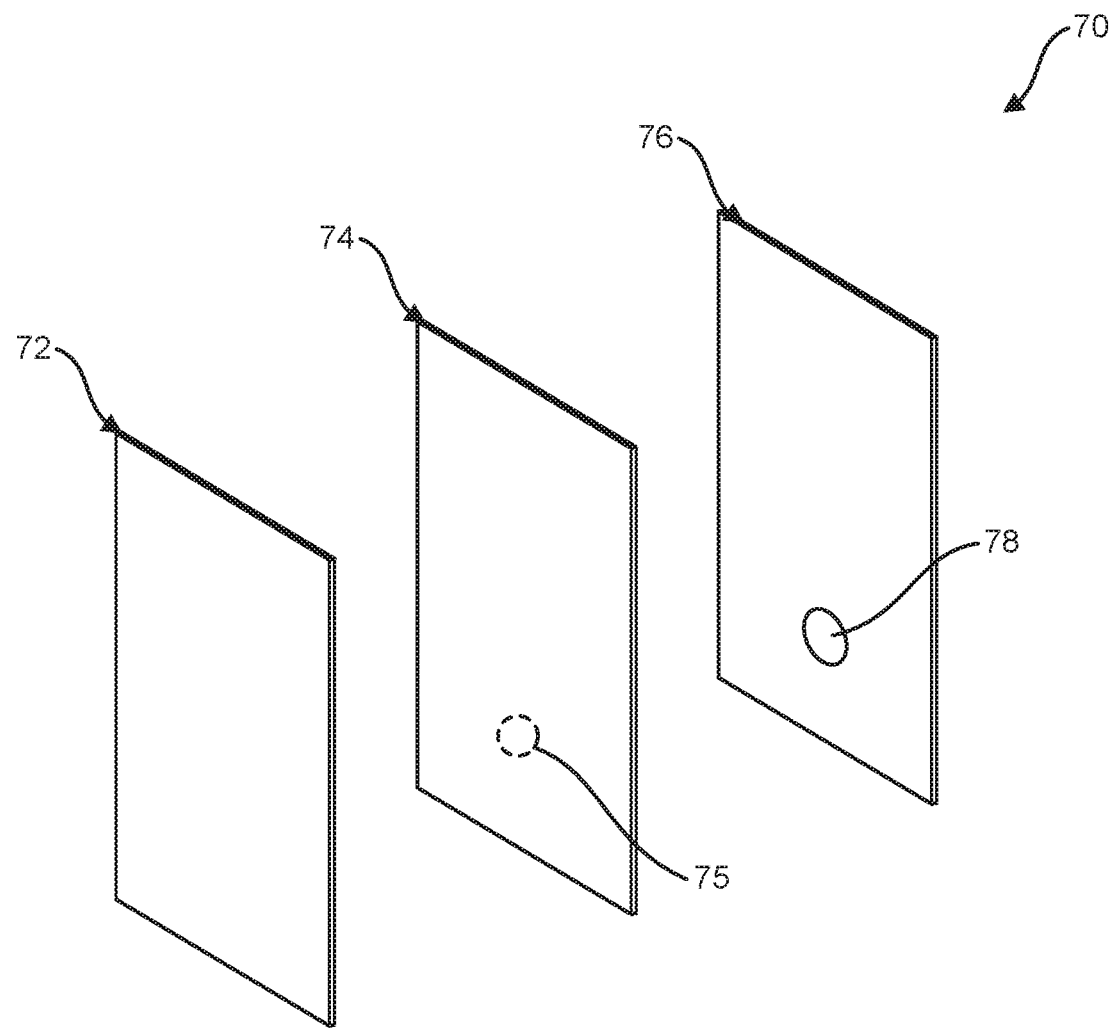
FIG. 13 illustrates an exploded view of the exemplary screen protector of FIG. 12.
Figure 14:
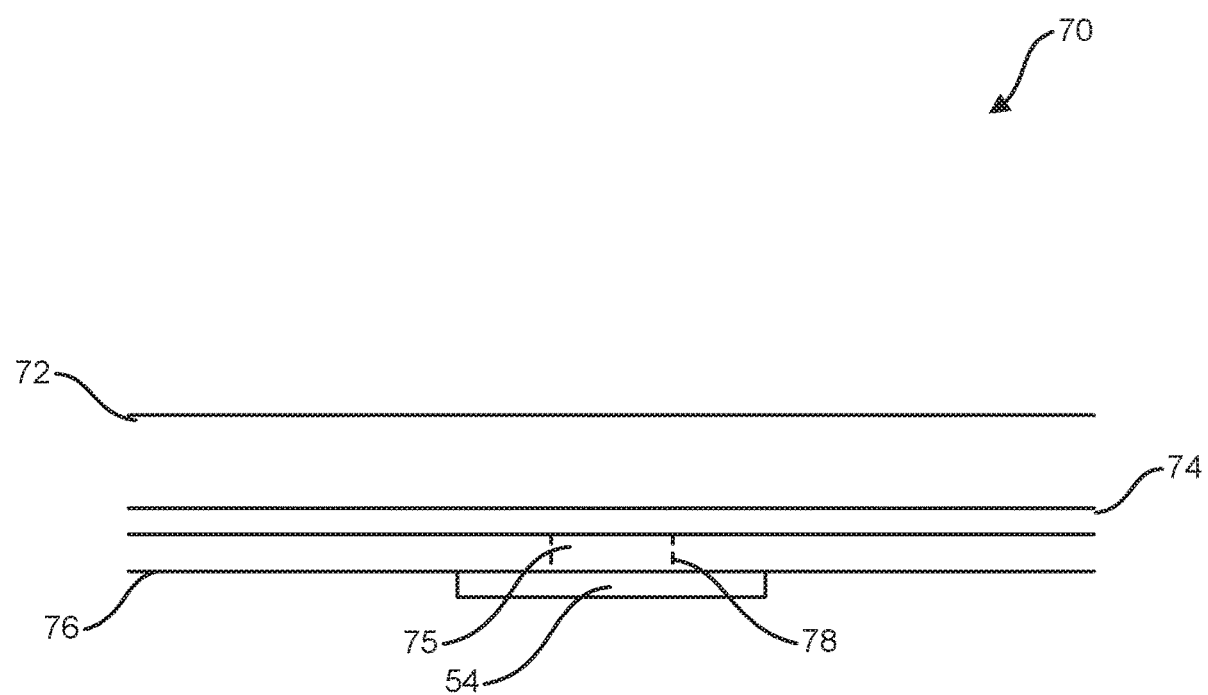
FIG. 14 illustrates a sectional view of the screen protector of FIG. 12.

Referring next to FIGS. 12-14, an exemplary screen protector 70 is illustrated. In some exemplary embodiments, screen protector 70 is provided as a built-in screen protector 70 in combination with a protective case 20 (see FIGS. 2 and 3). In other embodiments, screen protector 70 may be provided as a stand-alone screen protector 70.

In some exemplary embodiments, screen protector 70 includes a plurality of layers. Referring to FIGS. 13 and 14, screen protector 70 includes a front-facing layer 72, a coupling layer 74, and a device-facing layer 76. In some embodiments, screen protector 70 also includes one or more coating layers (not shown), such as hardcoat layers, oleophobic anti-fingerprint coatings, anti-microbial coatings, anti-glare coatings, and anti-reflective coatings.

Front-facing layer 72 is illustratively formed from a transparent material. In some exemplary embodiments, front-facing layer 72 is formed from a polymeric material. Exemplary polymeric materials include polyethylene terephthalate (PET), polycarbonate (PC), and poly(methyl methacrylate) (PMMA). In some exemplary embodiments, front-facing layer 72 is formed from a glass, such as soda lime glass or fortified glass. In some exemplary embodiments, front-facing layer 72 has a thickness as little as 0.020 mm, 0.025 mm, 0.05 mm, 0.075 mm, 0.1 mm, 0.125 mm, 0.15 mm, 0.175 mm, 0.2 mm, 0.25 mm, or greater, or within any range defined between any two of the foregoing values, such as 0.020 mm to 0.25 mm, 0.05 mm to 0.2 mm, or 0.1 mm to 0.15 mm.

Coupling layer 74 is provided on a rear-surface of the front-facing layer 72. In some exemplary embodiments, coupling layer 74 is formed from a polymeric material, such as a silicone adhesive. In some exemplary embodiments, coupling layer 74 is formed from a gel or gel-like material. In some exemplary embodiments, coupling layer 74 has a thickness as little as 0.001 mm, 0.005 mm, 0.01 mm, 0.015 mm, 0.02 mm, 0.025 mm, 0.03 mm, 0.035 mm, 0.04 mm, 0.05 mm, as great as 0.06 mm, 0.07 mm, 0.075 mm, 0.08 mm, 0.09 mm, 0.1 mm, 0.2 mm, 0.25 mm, or greater, or within any range defined between any two of the foregoing values, such as 0.001 mm to 0.25 mm, 0.005 mm to 0.05 mm, or 0.02 mm to 0.04 mm.

Device-facing layer 76 is provided on the rear-surface of coupling layer 74 opposite front-facing layer 72. In some exemplary embodiments, device-facing layer 76 is formed from a polymeric material. Exemplary polymeric materials include polyethylene terephthalate (PET), polycarbonate (PC), and poly(methyl methacrylate) (PMMA). In some exemplary embodiments, device-facing layer 76 is formed from a glass, such as soda lime glass or fortified glass. In some exemplary embodiments, device-facing layer 76 has a thickness as little as 0.005 mm, 0.01 mm, 0.02 mm, 0.025 mm, 0.03 mm, 0.04 mm, as great as 0.05 mm, 0.06 mm, 0.07 mm, 0.075 mm, 0.08 mm, 0.09 mm, 0.1 mm, or greater, or within any range defined between any two of the foregoing values, such as 0.005 mm to 0.1 mm, 0.025 mm to 0.075 mm, or 0.04 mm to 0.06 mm.

Device-facing layer 76 includes an aperture 78 allowing for a portion 75 of coupling layer 74 to extend through aperture 78 to directly contact the display 14 of electronic device 10 proximate fingerprint sensor 16. In some embodiments, portion 75 is provided as a thicker region of coupling layer 74. In some embodiments, coupling layer 74 is formed from a silicone material or a gel or gel-like material that allows some of coupling layer 74 to flow or extend into the area of aperture 78 to form portion 75 which is positioned to be in proximity to a fingerprint sensor when screen protector 70 is installed on an electronic device. In some embodiments, aperture 75 may be covered by a release liner 54.

Aperture 78 may be any suitable shape, including substantially round, substantially oval, triangular, rectangular, regular polygonal, or an irregular polygon or curved shaped. Aperture 78 illustratively has a diameter suitable for a user's fingerprint to be measured through. In some embodiments, aperture 78 has a diameter as little as 5 mm, 10 mm, 12 mm, 15 mm, 17 mm, 20 mm, as great as 25 mm, 30 mm, or greater, or within any range defined between any two of the forgoing values, such as 5 mm to 30 mm, 10 mm to 30 mm, or 15 mm to 25 mm. FIG. 14 provides a cross sectional view of the assembly of FIG. 13.

Figure 15:
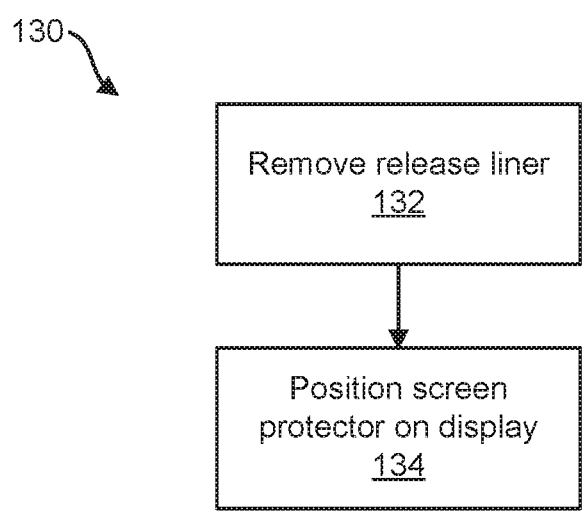
FIG. 15 is a schematic of an exemplary method of installing the screen protector of FIG. 12.

Referring to FIG. 15, an exemplary method 130 of installing a screen protector 70 on an electronic device 10 including an in-screen fingerprint sensor 16 is illustrated. In block 132, any release liner 54 covering aperture 78 is removed, exposing the portion 75 of coupling layer 74 through aperture 78 (see FIG. 14).

In block 134, the screen protector 70 is positioned over display 14 of electronic device in a location aligning aperture 78 with fingerprint sensor 16 (see FIG. 1). Pressure may be applied to the screen protector 70 to better form the contact between coupling layer 74 and the display 14, thereby wetting out the coupling layer 74.

Figure 16:
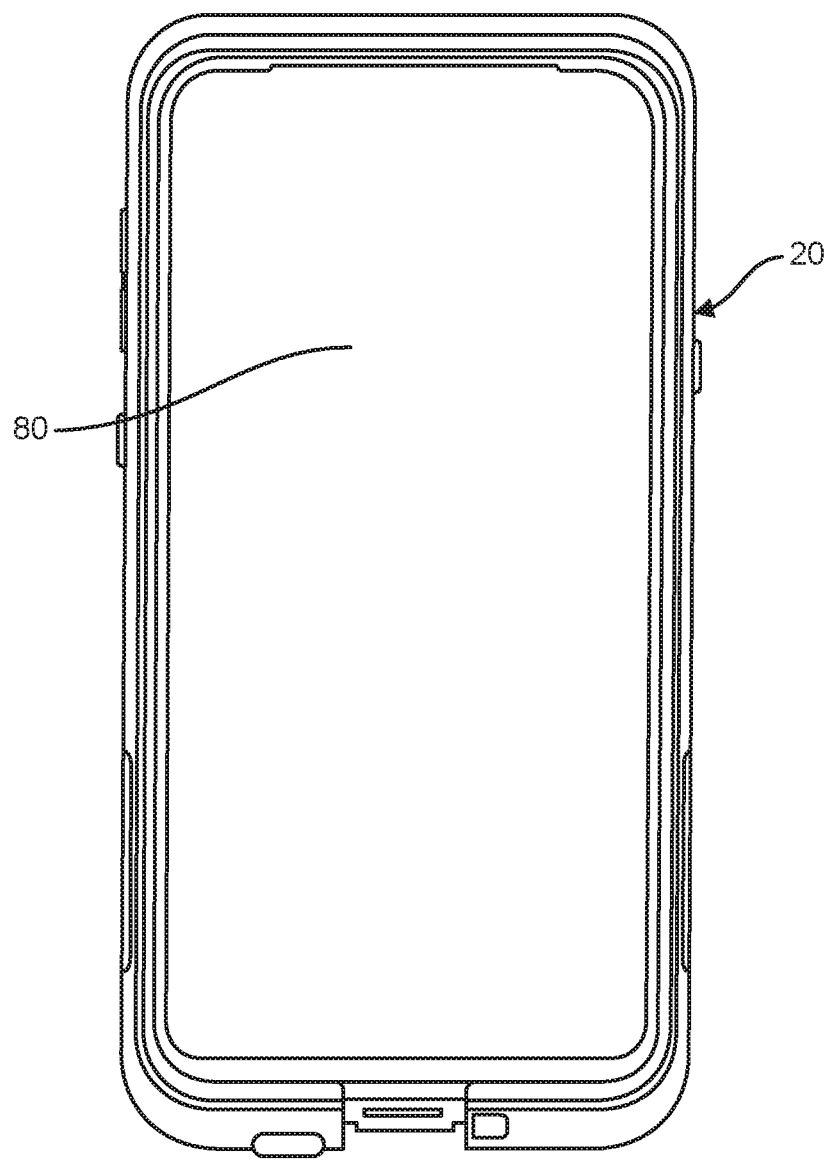
FIG. 16 illustrates a protective case and screen protector.
Figure 17:
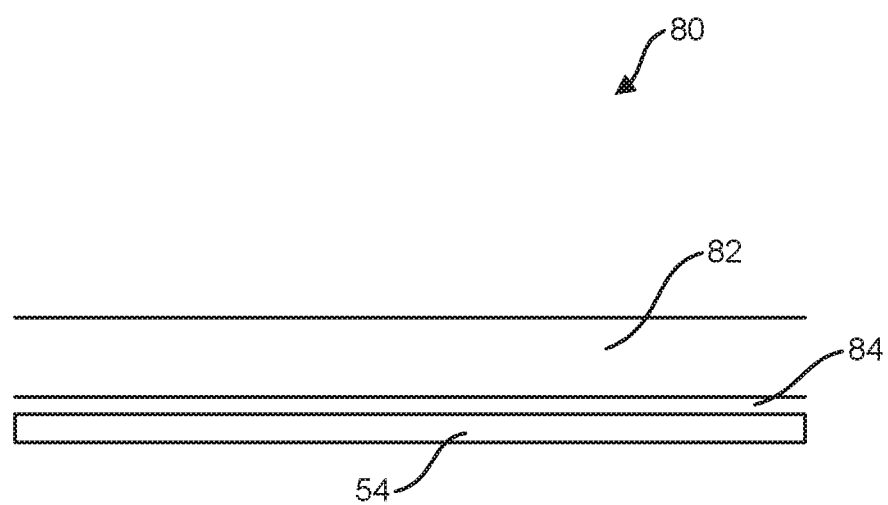
FIG. 17 is a sectional view of the screen protector of FIG. 16.

Referring next to FIGS. 16 and 17, an exemplary screen protector 80 is illustrated. In some exemplary embodiments, screen protector 80 is provided as a built-in screen protector 80 in combination with a protective case 20. In other embodiments, screen protector 80 may be provided as a stand-alone screen protector 70.

In some exemplary embodiments, screen protector 80 includes a plurality of layers. Referring to FIG. 17, screen protector 80 includes a front-facing layer 82 and a coupling layer 84. In some embodiments, screen protector 80 also includes one or more coating layers (not shown), such as hardcoat layers, oleophobic anti-fingerprint coatings, anti-microbial coatings, anti-glare coatings, and anti-reflective coatings.

Front-facing layer 82 is illustratively formed from a transparent material. In some exemplary embodiments, front-facing layer 82 is formed from a polymeric material. Exemplary polymeric materials include polyethylene terephthalate (PET), polycarbonate (PC), and poly(methyl methacrylate) (PMMA). In some exemplary embodiments, front-facing layer 82 is formed from a glass, such as soda lime glass or fortified glass. In some exemplary embodiments, front-facing layer 82 has a thickness as little as 0.020 mm, 0.025 mm, 0.05 mm, 0.075 mm, 0.1 mm, 0.125 mm, 0.15 mm, 0.175 mm, 0.2 mm, 0.25 mm, or greater, or within any range defined between any two of the foregoing values, such as 0.020 mm to 0.25 mm, 0.05 mm to 0.2 mm, or 0.1 mm to 0.15 mm.

Coupling layer 84 is provided on a rear-surface of the front-facing layer 82. In some exemplary embodiments, coupling layer 84 is formed from a polymeric material, such as a silicone adhesive. In some exemplary embodiments, coupling layer 84 is formed from a gel or gel-like material. Coupling layer 84 may be at least partially covered with a first release liner 54. In some exemplary embodiments, coupling layer 84 has a thickness as little as 0.001 mm, 0.005 mm, 0.01 mm, 0.015 mm, 0.02 mm, 0.025 mm, 0.03 mm, 0.035 mm, 0.04 mm, 0.05 mm, as great as 0.06 mm, 0.07 mm, 0.075 mm, 0.08 mm, 0.09 mm, 0.1 mm, 0.2 mm, 0.25 mm, or greater, or within any range defined between any two of the foregoing values, such as 0.001 mm to 0.25 mm, 0.005 mm to 0.05 mm, or 0.02 mm to 0.04 mm.

Figure 18:
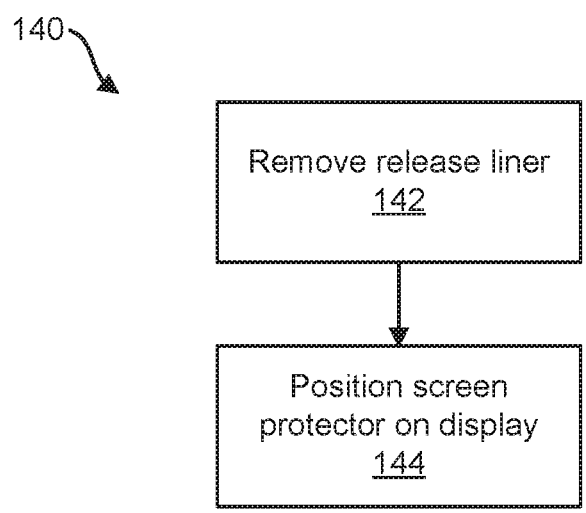
FIG. 18 is a schematic of an installing the screen protector of FIG. 16.

Referring to FIG. 18, an exemplary method 140 of installing a screen protector 80 on an electronic device 10 including an in-screen fingerprint sensor 16 is illustrated. In block 142, any release liner 54 covering coupling layer 84 is removed, exposing the coupling layer (see FIG. 17).

In block 144, the screen protector 80 is positioned over display 14 of electronic device (see FIG. 1). Pressure may be applied to the screen protector 80 to better form the contact between coupling layer 84 and the display 14, thereby wetting out the coupling layer 84.

Any of the techniques, improvements, features, functions, or processes described herein may be implemented in the form of a system or a kit. The system or kit may include any combination of the devices, components, elements, and/or modules disclosed herein.

The elements, components, and steps described herein are meant to exemplify some types of possibilities. In no way should the aforementioned examples limit the scope of the invention, as they are only exemplary embodiments. Moreover, the figures provided are meant to illustrate certain features of the embodiments. Unless otherwise noted, they are not provided to scale.

The phrases "in some embodiments," "according to some embodiments," "in the embodiments shown," "in other embodiments," "in some examples," "in other examples," "in some cases," "in some situations," "in one configuration," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations of the disclosed techniques may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention, except as limited by the prior art.

What is claimed is:

1. A screen protector for protecting a display screen of an electronic device including an in-screen fingerprint sensor, the screen protector comprising:
    a transparent front-facing layer;
    a coupling layer affixed to and completely covering a rear surface of the transparent front-facing layer, the coupling layer comprising a silicone-based adhesive; and
    a transparent rear-facing layer affixed to the coupling layer, the transparent rear-facing layer comprising an aperture configured to align with the in-screen fingerprint sensor of the electronic device when the screen protector is affixed to the display screen of the electronic device, the coupling layer configured to directly contact the display screen of the electronic device through the aperture when the screen protector is affixed to the display screen of the electronic device.

2. The screen protector of claim 1 wherein the coupling layer includes a first adhesive layer and a second adhesive layer, wherein the second adhesive layer comprises an acrylic material that is not present in the first adhesive layer.

3. The screen protector of claim 1 wherein the coupling layer wets to the display screen of the electronic device to form an improved optical path to the display screen of the electronic device.

4. The screen protector of claim 1 wherein the coupling layer is configured to be repeatedly affixed to the display screen and removed from the display screen.

5. The screen protector of claim 1 wherein the screen protector is attached to a protective case for the electronic device.

6. The screen protector of claim 5 wherein the protective case includes a back portion and a front portion that releasably couples to the back portion to contain the electronic device.

7. The screen protector of claim 6 wherein the screen protector is affixed to the front portion of the protective case.

* * * * *